United States Patent
Baker et al.

(10) Patent No.: US 6,267,419 B1
(45) Date of Patent: Jul. 31, 2001

(54) REMOTELY ACTUATED AND LOCKED HUB CLAMP

(75) Inventors: Gerald S. Baker; William M. Taylor, both of Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 09/175,127

(22) Filed: Oct. 19, 1998

(51) Int. Cl.$^7$ .................................................. F16L 17/00
(52) U.S. Cl. ........................... 285/364; 285/920; 285/406
(58) Field of Search .................................. 285/364, 406, 285/420, 373, 419, 920; 279/4.1, 4.11, 4.12, 2.07, 112, 121

(56) References Cited

U.S. PATENT DOCUMENTS

| | | | |
|---|---|---|---|
| 3,220,245 | * 11/1965 | Van Winkle | 285/364 |
| 3,790,181 | * 2/1974 | Scharfen | 279/4.11 |
| 4,437,643 | 3/1984 | Brakhage, Jr. et al. | 251/1 |
| 4,441,742 | 4/1984 | Owens, III | 285/18 |
| 4,725,080 | 2/1988 | Joseflak et al. | 285/24 |
| 4,730,853 | 3/1988 | Gjessing | 285/18 |
| 4,883,293 | 11/1989 | Lawson | 285/364 |

FOREIGN PATENT DOCUMENTS

| | | | |
|---|---|---|---|
| 9069 | * 5/1963 | (DE) | 285/920 |
| 2500896 | * 7/1976 | (DE) | 285/920 |
| 3731936 | * 4/1989 | (DE) | 285/920 |
| 373250 | * 6/1990 | (EP) | 285/364 |
| 1393982 | * 5/1988 | (RU) | 285/364 |
| 1416790 | * 8/1988 | (RU) | 285/364 |

OTHER PUBLICATIONS

1996–1997 Cameron Catalog (Cameron, Houston, Texas 77251–1212, 1996), pp. 379, 407, 427.

* cited by examiner

*Primary Examiner*—Teri Pham Luu
(74) *Attorney, Agent, or Firm*—Michael P. Hartmann (57) ABSTRACT

A clamping connector that can be remotely actuated and locked which is particularly useful in subsea applications for attaching subsea Christmas trees to marine wellheads. The clamping connector includes clamp halves linked by a locking stem. The locking stem is forced into a pre-stressed state by moving the locking stem from a first relaxed to a second pre-stressed position and retained in the second pre-stressed position by a locking collet. A locking collet through which the locking stem extends is moved from a first unlocked position to a second locked position wedged between the locking stem and one or the other of the clamp halves. When the locking collet is in the second locked position, it resists movement of the locking stem from the second pre-stressed position to the first relaxed position. The locking collet is then locked in the second locked position. The clamping connector of the present invention is characterized by a minimal height which is particularly advantageous over prior clamping connectors.

8 Claims, 7 Drawing Sheets

REMOTELY ACTUATED AND LOCKED HUB CLAMP

BACKGROUND OF THE INVENTION

The present invention relates to a remotely actuated and locked hub clamping connector particularly useful in subsea applications for attaching subsea Christmas trees to marine wellheads.

Wellheads are typically used in oil and gas production wells, injection wells, and storage wells, and in geothermal wells which produce steam for power generation. Wellheads are generally affixed to the casing or tubing strings of a well to enable production. In subsea applications, marine wellheads provide the control mechanism between the well and the surface equipment. To control the flow of the well, subsea Christmas trees, also called flow assembly devices, are attached to the wellhead. These subsea Christmas trees consist of a series of valves and fittings which enable the flow of the well to be controlled and enable the well to be externally shut-in if needed.

Generally speaking, several clamping connectors have been developed for attaching drilling and piping components to wellheads. For example, the FastLock™, the FlangeLock™, and the FastClamp™ Connector's illustrated and discussed on page 404 of the 1996–1997 Cameron Catalog of Oil Field Equipment, represent three such clamping connectors. Each of these three connectors is intended to replace flanged connectors and reduce the amount of time necessary for makeup. In each of the above designs, the wellhead is clamped to the drilling or piping component by applying a torque to a series of studs and nuts. These correctors are typically used onshore, as the necessity of requiring a torque to a series of studs and nuts makes these connectors impractical for use in subsea applications.

An additional onshore clamping connector is disclosed in prior art reference U.S. Pat. No. 4,883.293 (Lawson). Unlike the above three connectors, the Lawson connector achieves its clamping force by pre-stressing a series of tension members. The tension members are stretched, or preloaded or pre-stressed, by the application of hydraulic force. While in this preloaded state, a block is placed in the gap created by the stretched members which prohibits relaxation of the tension members. The attempt by the tension members to return to their relaxed, unloaded state creates a clamping force that continues until the blocks are removed and the tension members are able to return to their relaxed state. The necessity of placing the block in the gap created by the stretched members makes the connector impractical for use in subsea applications.

When dealing with subsea applications, it becomes necessary to simplify or eliminate totally the diver's tasks in locking the connector in order to secure the connection between the drilling or piping components and the wellhead. For that purpose, hydraulically actuated collet connectors such as are shown in U.S. Pat. No. 4,730,853 (Gjessing) have been developed and utilized. These collet-type connectors are designed for high pressure and deepwater drilling operations. The collet connectors are secured over the mating sections of the drilling or piping components to be connected by use of hydraulic pressure. Because the hydraulic pressure can be controlled remotely, it is not necessary for the divers to lock the collet connector in order to secure the connection.

Although effective, these prior subsea, hydraulically controlled connectors have the disadvantage of being tall, bulky, and thus, expensive. For example, the connector disclosed in U.S. Pat. No. 4,730,853 (Gjessing) must be tall enough to house the vertical locking components. The height of that connector is therefore dependent on the amount of clamping force desired: the greater the required clamping force desired, the taller the piston. In turn, the hub of the components to be connected must be at least as tall as the connector's housing. Consequently, if that connector is used to attach a subsea Christmas tree to a marine wellhead, the lower hub of the Christmas tree must extend upwardly from the wellhead to at least the top of the connector housing. The net effect is that the overall height of the subsea Christmas tree is increased. The increased height becomes extremely significant when discussing deepwater, subsea connections. Any increased height increases the length of the moment arm that is acted upon. Thus, with increased height, the connector is subjected to increased forces and moments and the connector consequently has decreased reliability and durability.

SUMMARY OF THE INVENTION

The present invention provides a new and improved clamping connector that is used in both subsea and surface applications. The present invention can be powered by mechanical means, or can utilize hydraulic or electric power so that the connector is remotely controlled if necessary. Although not limited to subsea applications, the use of remotely controlled power enables the connector of the present invention to be used in deepsea applications such as for attaching subsea Christmas trees to marine wellheads.

The present connector utilizes two clamp halves and a locking stem affixed to one clamp half and movable relative to the second clamp half from a first relaxed position to a second, pre-stressed position. The clamp halves are forced together and the locking stem is stretched, or preloaded or pre-stressed, by the application of forces generated by a power source (i.e., mechanical force, electric power, hydraulic pressure, etc.). While the locking stem is in this preloaded state, the power source is used to wedge a locking collet between the locking stem and the locking stem's exterior housing. When wedged between the locking stem and the housing, the locking collet resists the return of the stem from the second, pre-stressed position to its first, relaxed position even after the forces generated by the power source are relieved. The continued pre-stress on the locking stem provides the clamping force which enables the clamping connector to secure the connection. In the preferred embodiment, the locking stem is positioned in a bore in at least one of the clamp halves and the stem is locked in the pre-stressed position by a combination of the compressive clamping force, resulting from the wedging of the locking collet between the angled exterior surface of the locking stem and the angled interior surface of the clamp half, and the frictional engagement of the locking collet by the aforementioned angled surfaces.

It is, therefore, an object of the present invention to provide a new and improved clamping connector to overcome the above mentioned problems which limit the utility of prior connectors.

It is also an object of the present invention to provide a clamping connector which can utilize a power source such as hydraulic pressure to both open and close the connector. Because power sources such as hydraulic pressure can be controlled remotely, the connector is suitable for, but not limited to, subsea applications.

It is also an object of the present invention to decrease the overall height of the clamping connector that is necessary to provide a secure connection. (It should be noted that the term "height" as it is used in the present application simply refers to the dimension of the components along the plane perpendicular to the longitudinal axis of the locking stem). As discussed above, prior remotely controlled connectors have been limited by the height necessary to house all of the internal components. The present invention utilizes a unique and streamlined housing of its locking components. The locking stem and its housing are aligned perpendicular to the interior clamping surfaces. Thus, the only limitation on the overall height of the clamping connector of the present invention is that the connector must have sufficient height to provide sufficient surface area to enable the clamp halves to engage the hubs of the components to be clamped.

It is also an object of the present invention to provide a clamping connector that can be used subsea which has reduced overall height, and as a consequence, reduced overall weight and cost. By reducing the height and the necessity of a vertical housing these objects are achieved. As an additional advantage achieved by the reduction in overall height, weight, and cost, the present clamping connector is not limited to use in subsea applications. Prior subsea connectors have been extremely bulky, as discussed above and thus not a feasible alternative for surface applications. By contrast, the present clamping connector eliminates the undue bulkiness of the connector and thus has a wider range of possible applications.

It is another object of the present invention to provide a clamping connector that is not solely dependent on friction to provide the necessary locking forces. As the locking stem of the clamping connector of the present invention attempts to return to its relaxed state, in addition to the frictional forces generated between the locking stem, the wedged locking collet, and the locking stem's housing, a compressive force is generated. The compressive force, which acts in a direction perpendicular to the longitudinal axis of the locking stem, resists movement of the locking stem in a direction parallel to its longitudinal axis. Depending upon the coefficient of friction of the surfaces of the locking stem the wedged locking collet, and the locking stem's housing, the compressive forces generated may be able to resist movement of the locking stem to its relaxed state, without the additional aid of the frictional forces. For this reason, the connector of the present invention securely clamps a Christmas Tree to a wellhead (or other components) even if the coefficient of friction acting upon the wedged locking collet is decreased by grease or other materials on the locking stem, the locking stem housing, the locking collet or the other locking components of the clamping connector.

Other objects, and the advantages, of the present invention will be made clear to those skilled in the art by the following detailed description of a preferred embodiment constructed in accordance with the teachings of the present invention.

DETAILED DESCRIPTION OF THE PREFERRED EMBODIMENT

In the following detailed description of the preferred embodiments of the clamping connector of the present invention, the invention is described as connecting a subsea Christmas tree to a marine wellhead. Because the clamping connector of the present invention can be remotely controlled by utilizing a power source such as hydraulic pressure, it is particularly adapted for use in subsea applications. However, the present invention is not restricted to such subsea applications, nor is the present invention restricted to utilizing hydraulic pressure as its pressure source. Further, the present invention is not restricted to connections between wellheads and Christmas Trees. Those skilled in the art will recognize that the present invention is also used to advantage for connecting drilling and piping components other than wellheads and Christmas Trees. Those skilled in the art will also recognize from this description of the preferred embodiments of the present invention that the invention is not limited to a clamping connector for tubular members. The clamping connector of the present invention, with appropriate modifications as are known to those skilled in the art, is also well adapted for clamping many different types of elongate members together. Further, those skilled in the art will recognize that the members to be clamped together with the clamping connector of the present invention need not even be round in cross section. For this reason, reference will be made throughout this application to the "members" to be clamped by the present invention.

Figure 1:
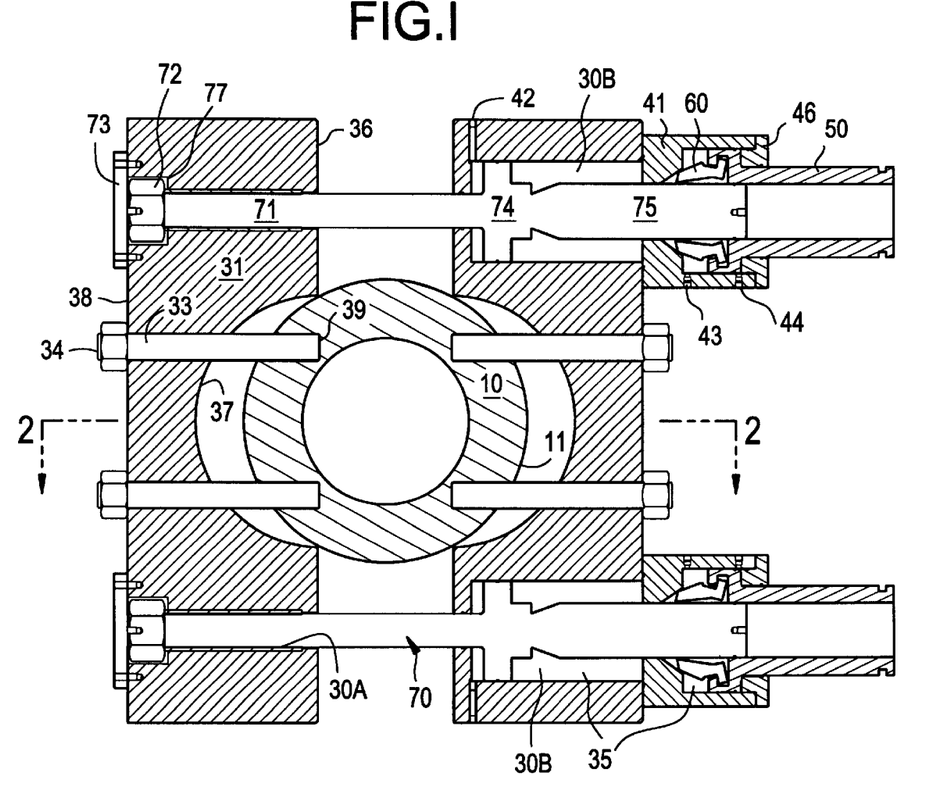
FIG. 1 is a sectional view of a first preferred embodiment of a clamping connector constructed in accordance with the teachings of the present invention shown in the open position.
Figure 2:
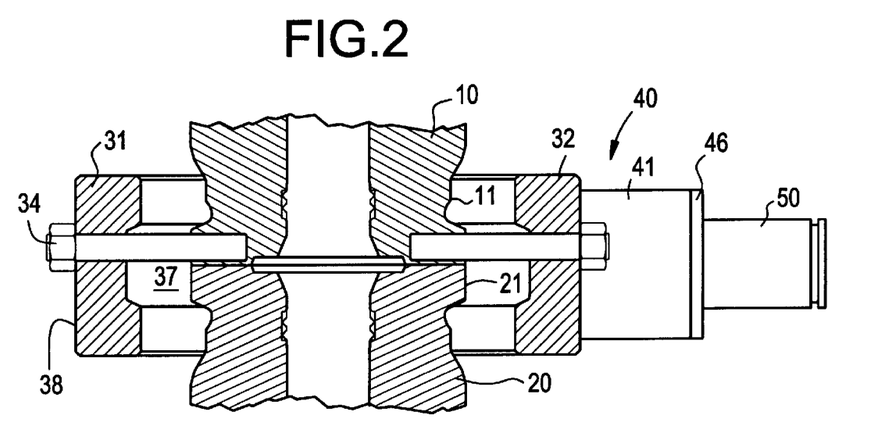
FIG. 2 is a sectional view of the clamping connector of FIG. 1 taken along the line 2—2 in FIG. 1.

A preferred embodiment of the present invention is shown in FIGS. 1 and 2 in its open position in orthogonal sectional views. The two halves of the clamping connector are indicated by numerals 31 and 32. Each clamp half 31, 32 is characterized by an inside face 36 and an exterior surface 38. In the preferred embodiment, the inside clamp face 36 is provided with an annular cut out 37 for contacting the surface of the members to be clamped. Using the example of clamping a subsea Christmas tree to a marine wellhead, the annular cut out 37 of the inside clamp face 36 contacts the outer surface 11 of the lower hub 10 of the Christmas tree (only a small portion of the Christmas tree being shown in the figures). Similarly, the outer surface 21 of the upper hub 20 of the marine wellhead is contacted by the annular cut out 37 of the inside clamp face 36. Although the preferred embodiment utilizes an annular cut out 37 of the inside face 36 of the clamp halves 31 and 32, those skilled in the art will recognize that other embodiments of the inside face 36 of the clamp halves 31 and 32 are equally effective depending upon the shape of the components to be connected.

The two clamp halves 31 and 32 are connected to the upper hub 10 (which is actually the lower hub of the Christmas tree) by guide bolts 33. The guide bolts 33 are secured to the outer surface 38 of the clamp halves 31 and 32 by stop nuts 34. The guide bolts 33 extend through the clamp halves 31 and 32 and protrude out the inside face 36. In the preferred embodiment, the guide bolts 33 protrude from the annular cut out 37 of the inside face 36. The protruding ends 39 of the guide bolts 33 are secured to the hub 10 of the component to be connected. One of the functions of the guide bolts 33 is to limit the outward movement of the clamp halves 31 and 32 away from the hub 10. For example, if connecting a subsea Christmas tree to a marine wellhead, the clamping connector is connected to the lower hub of the subsea Christmas tree and the entire ensemble is lowered onto the marine wellhead. The connection between the clamping connector and the hub 10 is established by securing the protruding ends 39 of the guide bolts 33 to the hub 10 and threading a stop nut 34 on the opposite end of the guide bolt 33. Outward movement of the clamp halves 31 and 32 away from the hub 10 while the Christmas tree and clamping connector are being lowered is restrained by the stop nuts 34 on the guide bolts 33. Once the exterior surfaces 38 of clamp halves 31 and 32 contact the stop nuts 34 threaded onto the guide bolts 33, any further movement away from hub 10 is prohibited.

Although the guide bolts 33 are useful in the preferred embodiment for connecting the clamp halves 31 and 32 to hub 10, they are not necessary for this purpose in all embodiments of the clamping connector. For example, if the clamping connector of the present invention is being used for surface applications, it is not subjected to the subsea currents and waves that tend to force the clamp halves 31 and 32 away from the hub 10 as the connector is lowered through the water. Further, the clamping connector can be used to clamp two piping components that are already in place.

However, the guide bolts 33 serve an additional purpose useful in both subsurface and surface applications by acting to guide the clamp halves 31 and 32 evenly into an open or closed position, thereby facilitating opening and closing the connector. The guide bolts 33 are particularly useful in opening the connector. For example, the clamping, connector is shown in its closed, or locked position in FIG. 3 and is opened and closed by the action of the locking mechanism indicated generally by numeral 40 (although shown with locking mechanisms 40 on both sides of the members being connected, the clamping connector of the present invention functions to advantage with any number of locking mechanisms 40). If one of the two locking mechanisms 40 shown in the preferred embodiment is unable to unlock or one side of the clamp is wedged so tightly over the hubs that it does not let go easily, the force imposed by the other locking mechanism 40 upon the clamp halves 31 and 32, and consequently on the guide bolts 33 and stop nuts 34 helps unlock the other locking mechanism 40. Again, this function of the guide bolts 33 is particularly useful when the clamping connector of the present invention is used in subsea applications because the guide bolts 33 decrease the likelihood that the locking mechanisms 40 will be unable to unlock such that divers would be forced to undertake the task.

Figure 3:
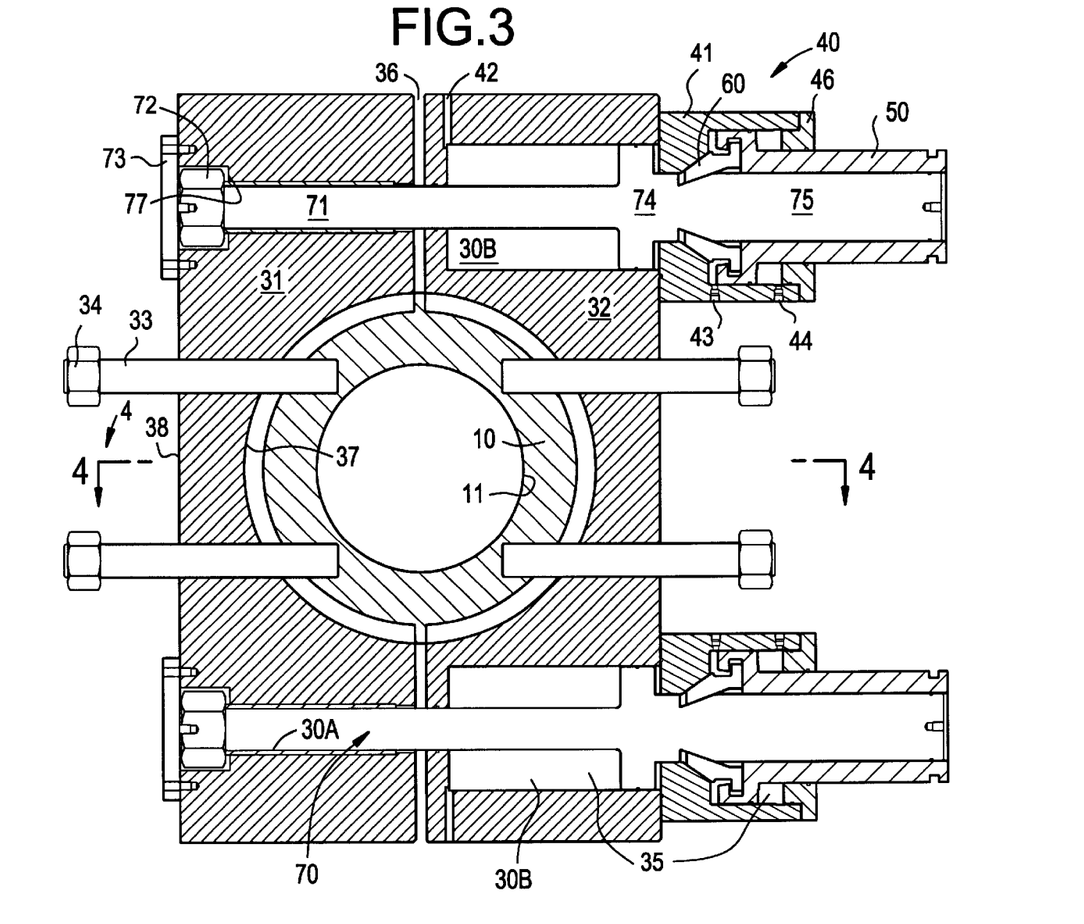
FIG. 3 is a sectional view of the clamping connector of FIG. 1 shown in the locked position.
Figure 4:
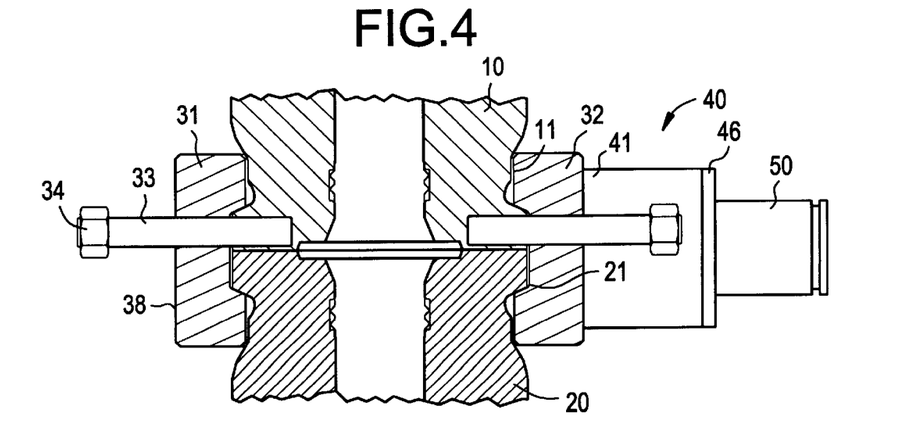
FIG. 4 is a sectional view of the clamping connector of FIG. 3 taken along the line 4—4 in FIG. 3.
Figure 5:
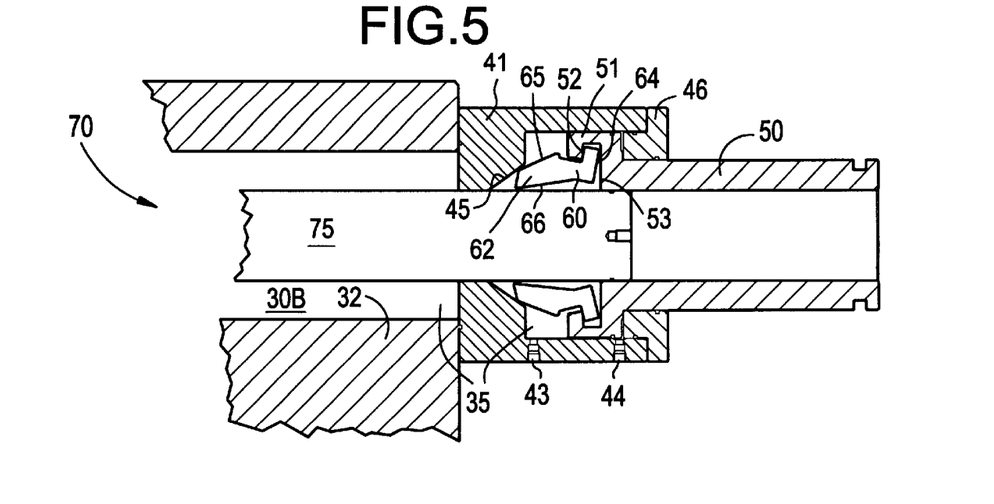
FIG. 5 is a detailed sectional view of the locking mechanism of the clamping connector of FIGS. 1 and 2 the unlocked position.
Figure 6:
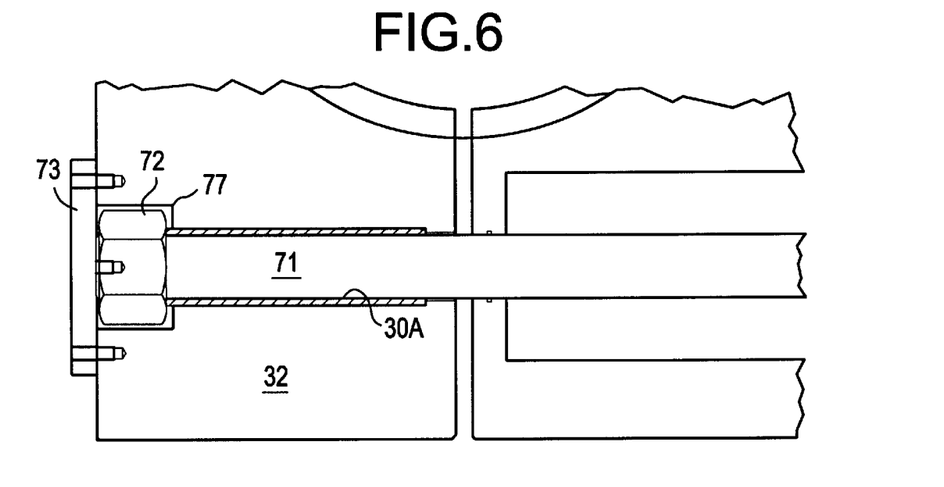
FIG. 6 is a detailed sectional view of the attachment of the locking stem to one of the clamp halves of the clamping connector of FIG. 1.

Referring to FIGS. 1, 3, and 5, the components of locking mechanism 40 are shown in detail. The stem 70 of locking mechanism 40 is positioned in and movable through a bore 30A and a cylinder 30B in clamp halves 31 and 32, respectively. A first, long end 71 of stem 70 extends through the bore 30A in clamp half 31 and is secured to clamp half 31 by lock nut 72 lock nut 72 is located in a recess 77 formed in the exterior surface 38 of the clamp half 31 which prevents inward movement of lock nut 72 toward locking mechanism 40. Because lock nut 72 is secured to the long end 71 of the locking stern 70, recess 77 restricts the long end 71 of the locking stem 70 from inward movement when acted upon by the locking mechanism 40. To prevent axial movement of locking stem 70 out of the clamp half 31, a protective plate cover 73 is secured to the exterior surface 38 of clamp half 31 over the lock nut recess 77 and the lock nut 72. Although the preferred embodiment utilizes a lock nut recess 77 and a protective plate 73 in conjunction with the lock nut 72 of the locking stem 70, alternate embodiments are practicable. It is only necessary that inward or outward axial movement of the long end 71 of locking stem 70 be restricted for the locking mechanism 40 to function in its intended manner Referring to FIGS. 5, 8, and 9, the second, short end 75 of locking stem 70 is movable within the cylinder 30B in clamp half 32. In the preferred embodiment, the short end 75 of locking stem 70 moves within a pressure chamber 35 comprising the cylinder 30B in clamp half 32, housing 41, and end cap 46, the housing 41 being integrally affixed to the exterior surface 38 of clamp half 32. The longitudinal axis of the cylindrical housing 41 is coincident with the longitudinal axis of the cylinder 30B in clamp half 32 so that the cylinder 30B in clamp half 32 and the housing 41 form a single, contiguous pressure chamber 35. In the preferred embodiment, the inside surface of housing 41 is provided with a tapered portion 45, the functions of which are set out below. The longitudinal axis of actuating piston 50 comprising a second pressure chamber is also coincident with the axis of the cylinder 30B in clamp half 32, the integral disengagement ring 51 of the actuating piston 50 being retained within the housing 41 by end cap 46 and movable therein by forces generated by a power source such as hydraulic pressure.

Locking stem 70 also comprises an intermediate piston portion 74 residing in and movable within pressure chamber 35 under forces generated by a power source such as hydraulic pressure. The stroke of the piston portion 74 of stem 70 is from the innermost surface of cylinder 30B (as shown in FIG. 8) to the exterior surface 38 of the clamp half 32 (as shown in FIG. 9).

The locking stem 70 also comprises a tapered outer surface 76 located on the short end 75 of the stem 70 proximate piston portion 74. In the preferred embodiment, the surface 76 of the short end 75 of the locking stem 70 is tapered at a lesser angle relative to the longitudinal axis of locking stem 70 than the tapered portion 45 (See FIG. 5) of the housing 41 comprising a portion of first pressure chamber 35.

Figure 7A:
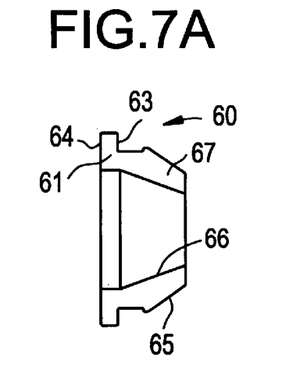
FIGS. 7A and 7B are sectional and top plan views, respectively, of the locking collet of the clamping connector of FIG. 1.
Figure 7B:
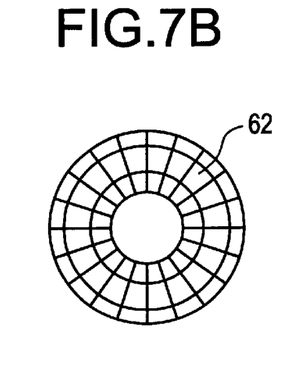
Figure 8:
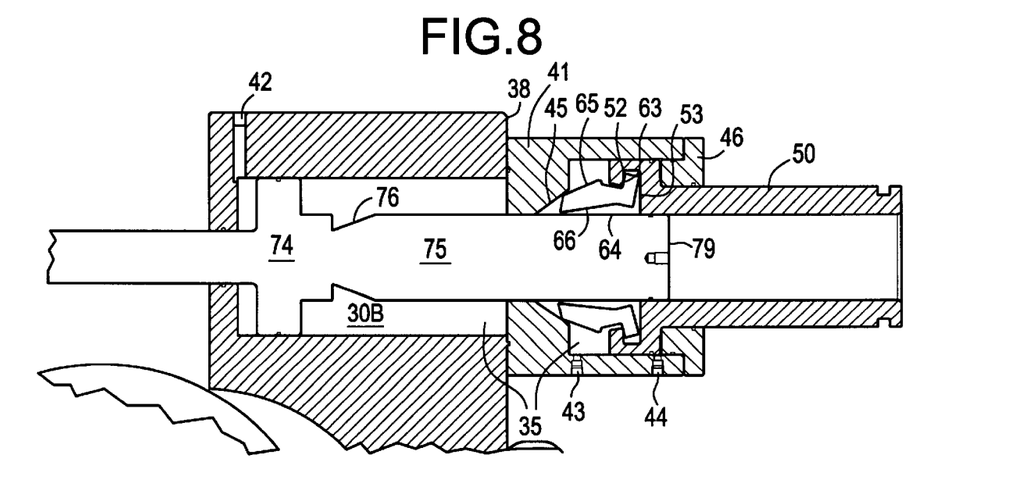
FIG. 8 is a sectional view of the locking mechanism of the clamping connector of FIG. 1 and in the unlocked position.
Figure 9:
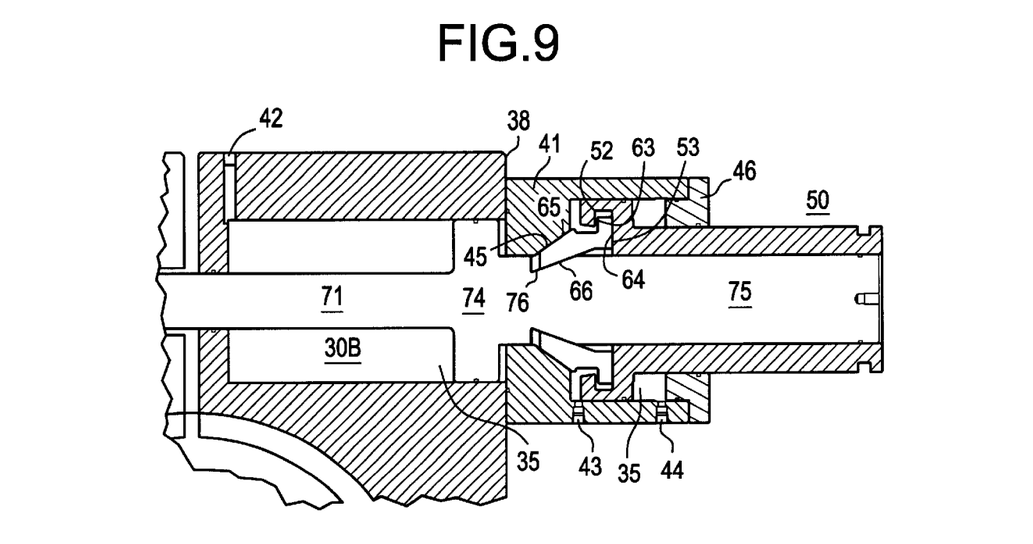
FIG. 9 is a sectional view of the locking mechanism of the clamping connector of FIG. 1 in the lock position.

Again referencing FIGS. 5, 8, and 9, a locking collet 60 through which the short end 75 of locking stem 70 is movable, is located within housing 41. Locking collet 60 is preferably comprised of a plurality of collet segments 62 as shown in FIGS. 7A and 7B, each collet segment 62 being formed with an outer tapered surface 65 and an inner tapered surface 66. As shown in FIGS. 8 and 9, the angle at which the outside and inner surfaces 65 and 66 of collet segments 62 are tapered are such that the legs 67 of the collet segments 62 are able to contact the inside surface 45 of housing 41 and the outer surface 76 of locking stem 70 in order to wedge tightly between the two surfaces. As noted above the angle at which the surface 45 of the housing 41 is tapered is greater relative to the longitudinal axis of locking stem 70 than the angle at which the outer surface 76 of locking stem 70 is tapered, which allows the collet segments 62 of the locking collet 60 to wedge tightly between the inside diameter of housing 41 and the outside surface of locking stem 70 when hydraulic pressure (used as the power source in a preferred embodiment) is applied at port 44 as shown in FIGS. 8 and 9 and described in more detail below.

As best shown in FIGS. 5 and 7, one end of each of the collet segments 62 is formed in the shape of a collet foot 61. The toe 63 and the sole 64 of collet foot 61 interact with disengagement ring 51 integrally formed upon the actuating piston 50 and locking stem 70 to enable the legs 67 of collet segments 62 to enter into and be released from a wedged position between the inside diameter of housing 41 and the outside surface of locking stem 70. Thus, the interaction between the disengagement ring 51 and collet foot 61 enables engagement and release of the clamp to the hubs 10 and 20 of the Christmas tree and wellhead, respectively, as discussed below. To enable operation of the clamp of the present invention in the preferred embodiment using hydraulic pressure as the power source, hydraulic pressure ports 43 and 44 are provided in the housing 41 on both sides of the disengagement ring 51 of actuating piston 50 and another pressure port 42 is provided in clamp half 32 on the opposite side of the piston portion 74 of stem 70 in the first pressure chamber 35.

Referring now to FIGS. 8 and 9, the manner in which the clamping connector of the present invention is opened and closed will be described. FIG. 8 shows the locking mechanism 40 in a first, relaxed position and FIG. 9 shows the locking mechanism in the second, pre-stressed position in which the clamp of the present invention is closed and locked. Again, it is important to note that the power source used in describing the operation of the clamping connector is hydraulic pressure. However, one skilled in the art will recognize that alternate power sources such as mechanical or electrical could also be utilized depending upon the application. Thus, although the following discussion focuses on the application of pressure at various ports in the clamping connector, the operational characteristics remain the same if the applied pressures arc replaced with applied forces generated by an alternate power source such as forces generated by a mechanical or electrical power supply.

To lock the clamp pressure is applied to port 42. The pressure at port 42 acts to draw the two clamp halves 31 and 32 together and, once the clamp halves are drawn together continued pressure acting on the piston portion 74 of locking stem 70 acts to stretch, or preload, locking stem 70.

While maintaining the pressure at port 42, pressure is also applied through port 44. The pressure to port 44 causes actuating piston 50 to move inwardly (toward the axis of the members being clamped together) from its first, open position to a second, closed position. The face 53 of the actuating piston 50 pushes against the sole 64 of the collet foot 61 of collet segments 62 comprising the locking collet 60, moving collet segments 62 from a first, unlocked position to a second, locked position in which the legs 67 of collet segments 62 are wedged between the tapered inside surface 45 of the housing 41 which forms an integral part of the pressure chamber 35 in clamp half 32 and the tapered outer surface 76 of locking stem 70.

Once the collet segments 62 are wedged between the tapered surfaces 45 and 76 (FIG. 9), the pressure to ports 42 and 44 is released. Even though the pressure to ports 42 and 44 is released, the stem 70 is retained in the stretched, or preloaded, condition by the compressive forces and frictional forces acting on the legs 67 of the collet segments 62. As stem 70 relaxes toward the first, open position, the interaction between the tapered outer surface 76 of the stem 70 and the inner tapered surface 66 of collet segments 62 and consequently, the interaction between the outer tapered surface 65 of collet segments 62 and the inside tapered portion 45 of housing 41, results in a compressive force between the pressure housing 41, the collet segments 62 comprising the locking collet 60, and the stem 70. The resulting compressive force combined with the frictional forces generated between the surfaces 65 and 66 of the locking collet and surfaces 45 and 76 of the pressure housing 41 and stem 70, respectively, resists the return of stem 70 to the first, relaxed position.

To open the clamping connector of the present invention, pressure is applied to port 42 to relieve the wedging action of the tapered surface 66 of the collet legs 67 against the tapered surface 76 of stem 70. While maintaining pressure to port 42, pressure is also applied to port 43 to force the actuating piston 50 outwardly (relative to the tubular members being clamped) from the second, closed position to the first, open position. As the actuating piston 50 moves, the overhanging surface 52 of disengagement ring 51 engages the toe 63 of the collet foot 61. This engagement of surface 52 and toe 63 transmits the force applied to actuating piston 50 to locking segments 62 to force the locking segments 62 out of the wedged, or locked, position shown in FIG. 9 towards the unlocked position shown in FIG. 8. Pressure is then released to port 42. The combination of the return of stem 70 to the first, relaxed position and the application of continued pressure on the actuating piston 50 from pressure port 43 opens the clamp halves 31 and 32. As discussed above, the stop nuts 34 on the studs 33 ensure that both clamp halves 31 and 32 completely clear the hubs 10 and/or 20 of the tubular members being clamped.

Referring flow to FIGS. 10–13, a second preferred embodiment of the remotely actuated, locking hub clamp of the present invention is shown. In this second preferred embodiment, the locking mechanism 40 additionally comprises a tip ring 80. The tip ring 80 is a locking device that ensures that the locking collet 60 remains securely wedged in its locked position shown in FIG. 11. In the description of the second preferred embodiment, the power source described is hydraulic pressure. Again, one skilled in the art will recognize that alternate mechanical or electrical power can be utilized depending upon the application. Thus, although described in terms of pressure applied at pressure ports located in the clamping connector, the second preferred embodiment can be operated by application of forces generated by an alternate source such as mechanical or electrical means.

Figure 10:
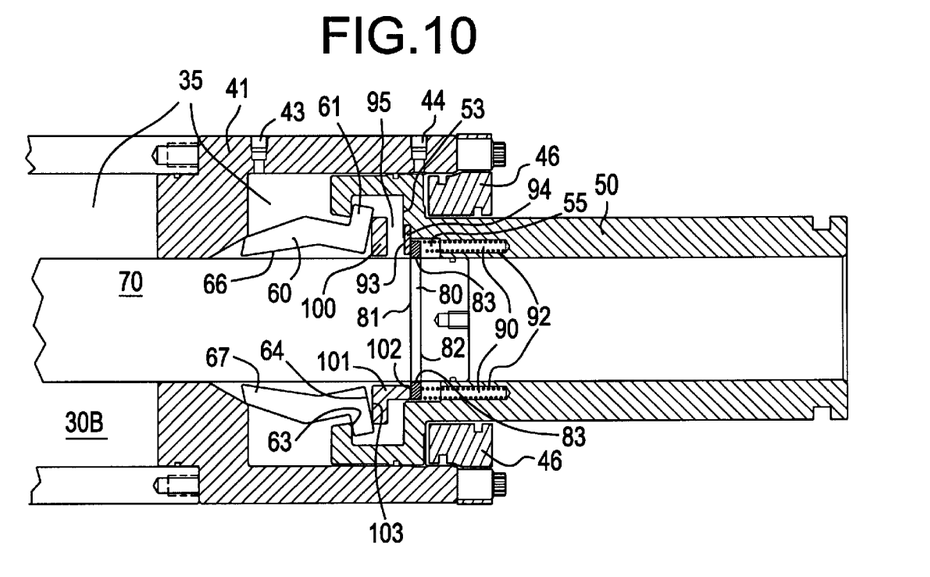
FIG. 10 is a sectional view of the locking mechanism of a second preferred embodiment of a clamping connector constructed in accordance with the teachings of the present invention shown in the unlocked position.

As shown in FIG. 10, in this second preferred embodiment, a recess 55 is cut out of the face 53 of the actuating piston 50 along its inner diameter. Spring housings 92 are cut out of the recess 55. Affixed to the base of the spring housings 92 are engagement springs 90. The external ends 91 of the engagement springs 90 contact the spring-side surface 82 of tip ring 80 to bias the tip ring 80 toward locking collet 60. The outside diameter of tip ring 80 is sized to fit in the recess 55 formed in the face 53 of actuating piston 50, and the inside diameter is of such dimension that the locking stem 70 is able to travel therethrough.

Figure 12:
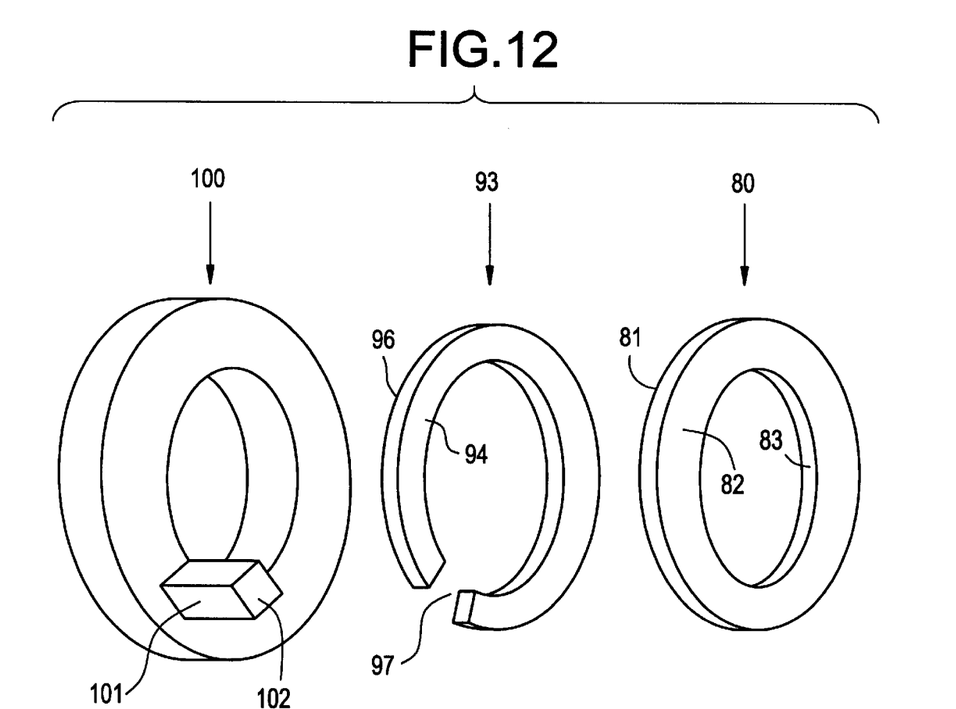
FIG. 12 is a perspective view of the activation ring, spring plate, and tip ring of the clamping connector of FIG. 10.

As shown in perspective view in FIG. 12, the collet-side surface 81 of the tip ring 80 interacts with a spring plate 93 and an activation ring 100. The inside diameter of spring plate 93 is sized so that the locking stem 70 is able to pass freely through the opening in spring plate 93 and the outside diameter of spring plate 93 is greater than that of tip ring 80. An activation gap 97 is located along the circumference of the spring plate 97. The inside diameter of the opening in activation ring 100 is also dimensioned so that the locking stem 70 is able to pass through activation ring 100 without restriction. Further, activation ring 100 is provided with an activation bit 101 at a location that coincides with the location of the activation gap 97 on spring plate 93, so that the bearing surface 102 thereof engages the collet-side surface 81 tip ring 80.

As shown in FIG. 10, the spring plate 93 is affixed to the face 53 of the actuating piston 50 and extends over the recess 55, and the activation ring 100 is located within the pressure housing 41 between the locking collet 60 and the tip ring 80. While the locking mechanism 40 is in its unlocked, or open, position, the engagement springs 90 bias the tip ring 80 into engagement with the spring plate 93 and into engagement with the bearing surface 102 of the activation bit 101, which extends through the activation gap 97 of the spring plate 93 until the bearing surface 102 is aligned with the spring-side surface 94 of the spring plate 93. The engagement of the spring plate 93 and the activation bit 101 by the tip ring 80 prevents the engagement spring 90 from further outward movement. Thus, the engagement spring 90 is maintained in a compressed state and the tip ring 80 is held in a perpendicular plane with respect to the locking stem 70 by the combined effort of the spring plate 93 and the activation bit 101. Further, a spring gap 95 is created between the activation ring 100 and the spring plate 93 (except where the activation bit 101 is located).

Figure 11:
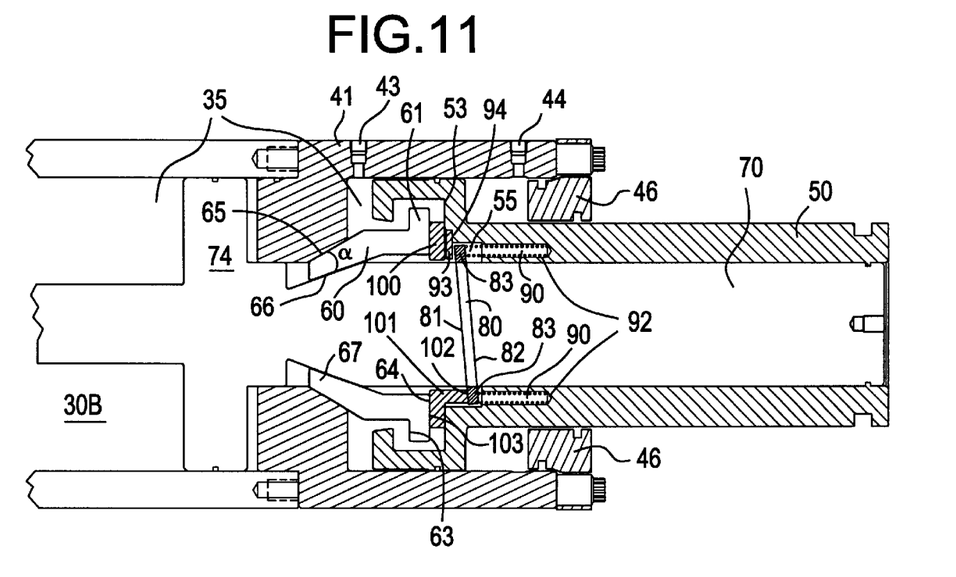
FIG. 11 is sectional view of the locking mechanism of the clamping connector of FIG. 10 shown in the locked position.

To lock this second embodiment of the clamp of the present invention, pressure is applied to port 42 (not shown in FIG. 10 or 11, but shown in FIGS. 8 and 9). The pressure at port 42 acts to draw the two clamp halves 31 and 32 together and, once the clamp halves are drawn together, continued pressure acting on the piston portion 74 of locking stem 70 acts to stretch, or preload, locking stem 70. While maintaining the pressure at port 42, pressure is also applied through port 44. The pressure to port 44 causes actuating piston 50 to move inwardly (toward the axis of the members being clamped together) from its first, open position to a second, closed position. As the actuating piston 50 moves inwardly, the collet-side surface of the tip ring 80 pushes against the bearing, surface 102 of the activation bit 101 of activation ring 100. Consequently, the collet-side surface 103 of activation ring 100 pushes against the soles 64 of the collet segments 62 comprising locking collet 60, moving locking collet 60 from a first, unlocked position to a second, locked position in which the legs 67 of each collet segment 62 are wedged between the tapered inside surface 45 of the housing 41 which forms an integral part of the pressure chamber 35 in clamp half 32 and the tapered outer surface 76 of locking stem 70.

Once the legs 67 of collet segments 62 are wedged between surfaces 45 and 76, continued pressure supplied by port 44 results in further inward movement of the actuating piston 50. As shown in FIG. 11, except where the activation bit 101 is located, the actuating piston 50 moves inwardly toward the activation ring 100 until the spring gap 95 is closed and the outer surface 96 of the spring plate 93 is in abutment with the activation ring 100. Where the activation bit 101 is located, the spring plate 93 is prevented from further inward movement. Further, the reactive force supplied by the bearing surface 102 of activation bit 101 to the collet-side surface 81 of the tip ring 80 compresses the engagement spring 90. Because the displacement of tip ring 80 towards the locking collet 60 and in a direction parallel to the longitudinal axis of locking stem 70 is not uniform around its entire circumference, tip ring 80 is forced into an angled position as shown in FIG. 11. The resulting angled position of the tip ring 80 causes the inner surfaces 83 of tip ring 80 to engage the outer surface of the locking stem 70 to provide resistance to further movement of the locking stem 70 through the tip ring 80 in either direction.

Figure 13:
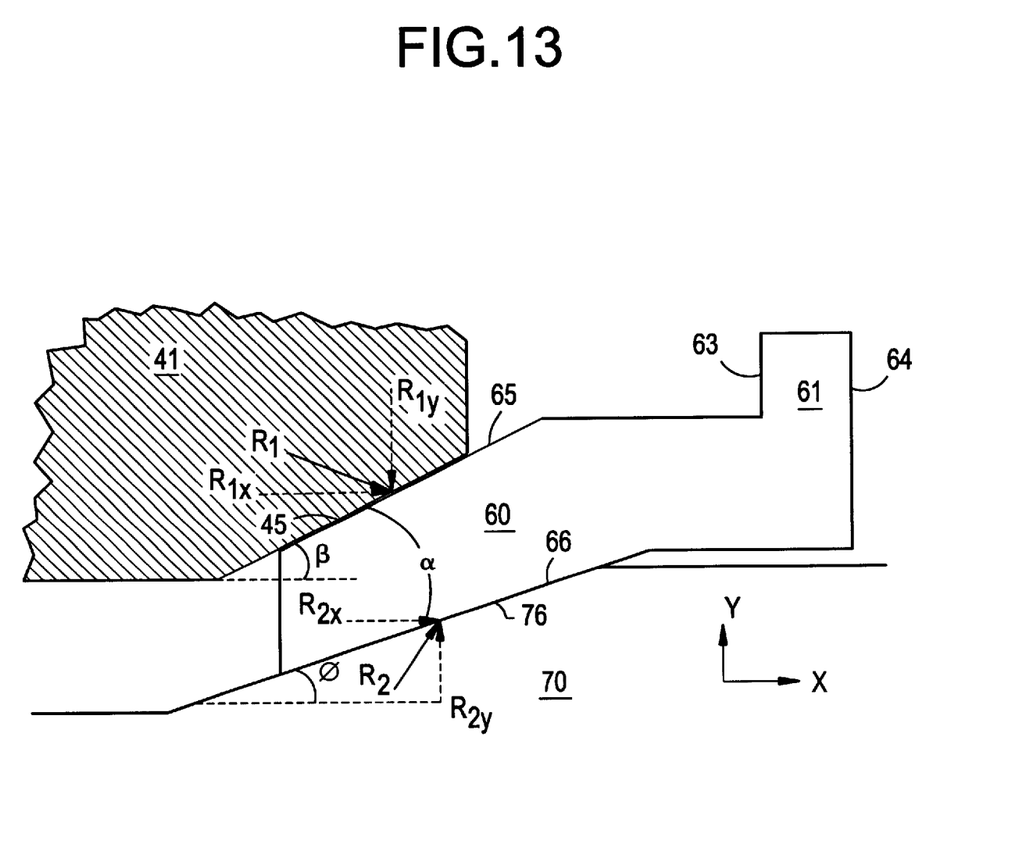
FIG. 13 is a detailed sectional view of the locking mechanism of FIG. 11.

The main advantage of the tip ring 80 being in this angled position is to prevent the locking collet 60 from being forced out of its wedged position. As mentioned above in the discussion of the first embodiment, the collet segments 62 comprising locking collet 60 are wedged between two angled surfaces. The two angled surfaces are shown in FIG. 13. The angle $\beta$ is the angle of surface 45 of the housing 41 in relation to the longitudinal axis of the locking stem 70, and the angle ● is the angle of outer tapered surface 76 of the locking stem 70 in relation to the longitudinal axis of the locking stem 70. The difference between angles $\beta$ and ● is the wedge angle $\alpha$, shown in FIG. 13.

The two angled surfaces 45 and 76 along the housing 41 and the locking stem 70 exert reactive forces $R_1$ and $R_2$ upon the locking collet 60. $R_1$ and $R_2$ exert both a compressive force $R_{1y}$ and $R_{2y}$, and a longitudinal force $R_{1x}$ and $R_{2x}$ upon the locking collet. As the wedge angle $\alpha$ increases, the longitudinal components $R_{1x}$ and $R_2$ increase and the compressive components $R_{1y}$ and $R_2$, decrease. The result is that the greater the wedge angle $\alpha$, the higher the longitudinal reactive forces trying to force the locking collet 60 out of its wedged position. As long as the tangent of wedge angle $\alpha$ remains less than or equal to the coefficient of friction between the angled surfaces 45 and 76 (located along the housing 41 and the locking stem 70) and the angled surfaces 65 and 66 (located on locking collet 60), the locking collet 60 remains in the second, locked position. If the wedge angle $\alpha$ is great enough that the tangent of wedge angle $\alpha$ is greater than the coefficient of friction of the above mentioned angled surfaces, then the compressive forces $R_{1y}$ and $R_{2y}$ are not high enough to keep the locking collet 60 in its wedged position. However, if a tip ring 80 is used, the locking collet 60 is prevented from being forced out of its wedged position. As the angled surfaces attempt to force the locking collet 60 out of its wedged position, the sole 64 of the locking collet 60 pushes against the base 103 of the activation ring 100, which in turn, pushes against the tip ring 80. The tip ring 80, however, is prevented from further movement by engagement of the inner diameter surfaces 83 with the outer surface of the locking stem 70 as discussed above. Thus, the locking collet 60 is prevented from any further movement.

Although described in terms of the preferred embodiments shown in the figures, those skilled in the art who have the benefit of this disclosure will recognize that changes can be made to the individual component parts thereof which do not change the manner in which those components function to achieve their intended result. For instance, the legs 67 of the collet segments 62 of locking collet 60 need not be shaped as shown in FIG. 7. Other embodiments of the legs 67 of the locking collet 60 can be utilized to achieve the desired function. The legs 67 only need to be able to restrict movement of the locking stem 70 from a pre-stressed position to a relaxed position. All such changes are intended to fall within the scope of the following non-limiting claims.

What is claimed is:

1. Apparatus for clamping adjacent clamping members, comprising:

first and second clamp halves each having an inside face, said first and second clamp halves having an annular cutout formed on said inside face for engaging an outer surface formed on adjacent upper and lower hubs and securing adjacent upper and lower hubs in abutting relationship;

a plurality of locking stems secured to said first clamp half and extending from said first clamp half to said second clamp half;

each of said locking stems having an intermediate piston portion formed thereon, said intermediate piston portions axially movable by a power source within a corresponding cylinder formed in said second clamp half between a first relaxed position and a second pre-stressed position wherein said annular cutout on said first and second clamp halves contact said outer surfaces formed on said upper and lower hubs, and;

a pair of locking mechanisms integrally affixed to said second clamp half, said locking stems extending through said locking mechanisms and axially aligned with said locking mechanisms, said locking mechanisms engaging and securing said locking stems in said second pre-stressed position when said first and second clamp halves engage and secure said upper and lower hubs in abutting relationship.

2. Apparatus for clamping adjacent clamping members according to claim 1, wherein each of said locking mechanisms includes:

a housing integrally affixed to said second clamp half and axially aligned with said locking stem, said housing having an inner tapered portion;

a pressure responsive actuating piston axially aligned with said housing; and, a locking collet positioned within said housing and movable between a first unlocked position and a second locked position by said pressure responsive actuating piston.

3. Apparatus for clamping adjacent clamping members according to claim 2, wherein:

said locking collet includes a plurality of collet segments, said plurality of collet segments having inner and outer tapered surfaces;

said locking stems secured to said first clamp halves having a tapered outer surface; and, said inner and outer tapered surfaces of said collet segments engaging said tapered outer surface of said locking stems and said tapered portion of said housing, respectively, to lock said locking stems in said second pre-stressed position when said locking collet is moved to said second locked position by said pressure responsive actuating piston.

4. Apparatus for clamping adjacent clamping members according to claim 3, wherein:

said actuating piston includes a disengagement ring;

each of said collet segments include a collet foot formed thereon; and, said disengagement ring of said actuating piston coacting with said collet feet of said collet segments to move said collet segments between said second locked position and said first unlocked position when said pressure responsive actuating piston is actuated.

5. Apparatus for clamping adjacent clamping members according to claim 4, wherein:

the angle of said tapered outer surface of said locking stem relative to the longitudinal axis of said locking stem is less than the angle of said inner tapered portion of said housing relative to the longitudinal axis of said locking stem.

6. Apparatus for clamping adjacent clamping members according to claim 5, wherein said locking mechanism further includes:

a recess formed in said actuation piston adjacent said disengagement ring;

said recess having a plurality of spring housings formed therein and a plurality of engagement springs disposed therein;

a tip ring positioned adjacent said plurality of engagement springs;

a spring plate positioned adjacent said tip ring and secured within said recess, said spring plate having a gap therein;

an activation ring positioned adjacent said spring plate, said activation ring including an activation bit, said activation bit extending through said gap in said spring plate to engage said tip ring;

said locking stem movable through said activation ring, said spring plate and said tip ring;

said plurality of engagement springs urging said tip ring into contact with said spring plate; and, said activation bit contacting said tip ring and urging said tip ring into contact with said locking stem to thereby lock said locking stem when said pressure responsive actuating piston is actuated to said second locked position.

7. A method of clamping adjacent clamp hubs in abutting relationship, said clamping apparatus comprising:

first and second clamp halves each having an inside face, said first and second clamp halves having an annular cutout formed on said inside face for engaging an outer surface formed on adjacent upper and lower hubs and securing adjacent upper and lower hubs in abutting relationship;

a plurality of locking stems secured to said first clamp half and extending from said first clamp half to said second clamp half, said locking stems having a tapered outer surface;

each of said locking stems having an intermediate piston portion formed thereon, said intermediate piston portions axially movable by a power source within a corresponding cylinder formed in said second clamp half between a first relaxed position and a second pre-stressed position wherein said annular cutout on said first and second clamp halves contact said outer surfaces formed on said upper and lower hubs, and;

a pair of locking mechanisms integrally affixed to said second clamp half, said locking stems extending through said locking mechanisms and axially aligned with said locking mechanisms, said locking mechanisms engaging and securing said locking stems in said second pre-stressed position when said first and second clamp halves engage and secure said upper and lower hubs in abutting relationship;

said method of clamping adjacent clamp hubs in abutting relationship comprising the steps of;

operating a power source to move a plurality of intermediate pistons in corresponding cylinders formed in said second clamp half to urge said annular cutouts formed on said inside face of said first and second clamp halves into engagement with said adjacent upper and lower hubs and securing said adjacent upper and lower hubs in abutting relationship and induce a pre-stressed condition in said locking stems; and, operating said locking mechanisms to engage said locking stems and maintain said locking stems in said pre-stressed condition.

8. A method of clamping adjacent clamp hubs in abutting relationship according to claim 7, said locking mechanism further comprising:

a housing integrally affixed to said second clamp half and axially aligned with said locking stem, said housing having an inner tapered portion;

a pressure responsive actuating piston axially aligned with said housing;

a locking collet positioned within said housing and movable between a first unlocked position and a second locked position by said pressure responsive actuating piston;

said method of clamping adjacent clamp hubs in abutting relationship further comprising the steps of;

operating said pressure responsive actuating piston to a second closed position to urge said locking collet into locking engagement with tapered outer surface formed on said locking stems; and, releasing pressure from said pressure responsive actuating piston to leave said locking collet in locking engagement with tapered outer surface formed on said locking stems.

\* \* \* \* \*